(12) United States Patent
Brown

(10) Patent No.: US 7,895,501 B2
(45) Date of Patent: Feb. 22, 2011

(54) METHOD FOR AUDITING DATA INTEGRITY IN A HIGH AVAILABILITY DATABASE

(75) Inventor: David E. Brown, Valinda, CA (US)

(73) Assignee: Vision Solutions, Inc. DE (US)

( * ) Notice: Subject to any disclaimer, the term of this patent is extended or adjusted under 35 U.S.C. 154(b) by 1052 days.

(21) Appl. No.: 11/702,860

(22) Filed: Feb. 6, 2007

(65) Prior Publication Data
US 2008/0189498 A1 Aug. 7, 2008

(51) Int. Cl.
*H03M 13/00* (2006.01)

(52) U.S. Cl. .................. 714/758; 711/162; 711/114

(58) Field of Classification Search .................. 714/758; 711/114, 162
See application file for complete search history.

(56) References Cited

U.S. PATENT DOCUMENTS

| | | | |
|---|---|---|---|
| 5,649,089 A | 7/1997 | Kilner | |
| 6,233,589 B1 | 5/2001 | Balcha et al. | |
| 6,480,970 B1 | 11/2002 | DeKoning et al. | |
| 6,526,418 B1 | 2/2003 | Midgley et al. | |
| 6,533,388 B2 | 3/2003 | Toh et al. | |
| 6,625,623 B1 | 9/2003 | Midgley et al. | |
| 6,640,055 B2 | 10/2003 | Nishimura et al. | |
| 6,704,755 B2 | 3/2004 | Midgley et al. | |
| 6,847,984 B1 | 1/2005 | Midgley et al. | |
| 6,898,669 B2 * | 5/2005 | Tomita | 711/114 |
| 7,200,626 B1 * | 4/2007 | Hoang et al. | 1/1 |
| 2002/0174139 A1 | 11/2002 | Midgley et al. | |
| 2003/0074378 A1 | 4/2003 | Midgley et al. | |
| 2004/0268178 A1 | 12/2004 | Fredin | |

* cited by examiner

*Primary Examiner*—Guy J Lamarre
(74) *Attorney, Agent, or Firm*—Stetina Brunda Garred & Brucker

(57) ABSTRACT

A method for maintaining the integrity of a backup database table on a secondary node against a continuously replicated and dynamically changing original database table on a primary node includes generating an original checksum of a segment of the original database table between a beginning record and an ending record. The checksum and identification data may be stored in an original control database table. The original control database table may be replicated to a backup control database table. Thereafter, a backup checksum of a segment of the backup database table between a beginning record and an ending record is generated. A comparison between the backup checksum and the original checksum is made in response to a triggering update to the backup control database table. Collisions by application generate transactions in the source and target databases may be detected despite the use of third party "black box" replication processes.

24 Claims, 9 Drawing Sheets

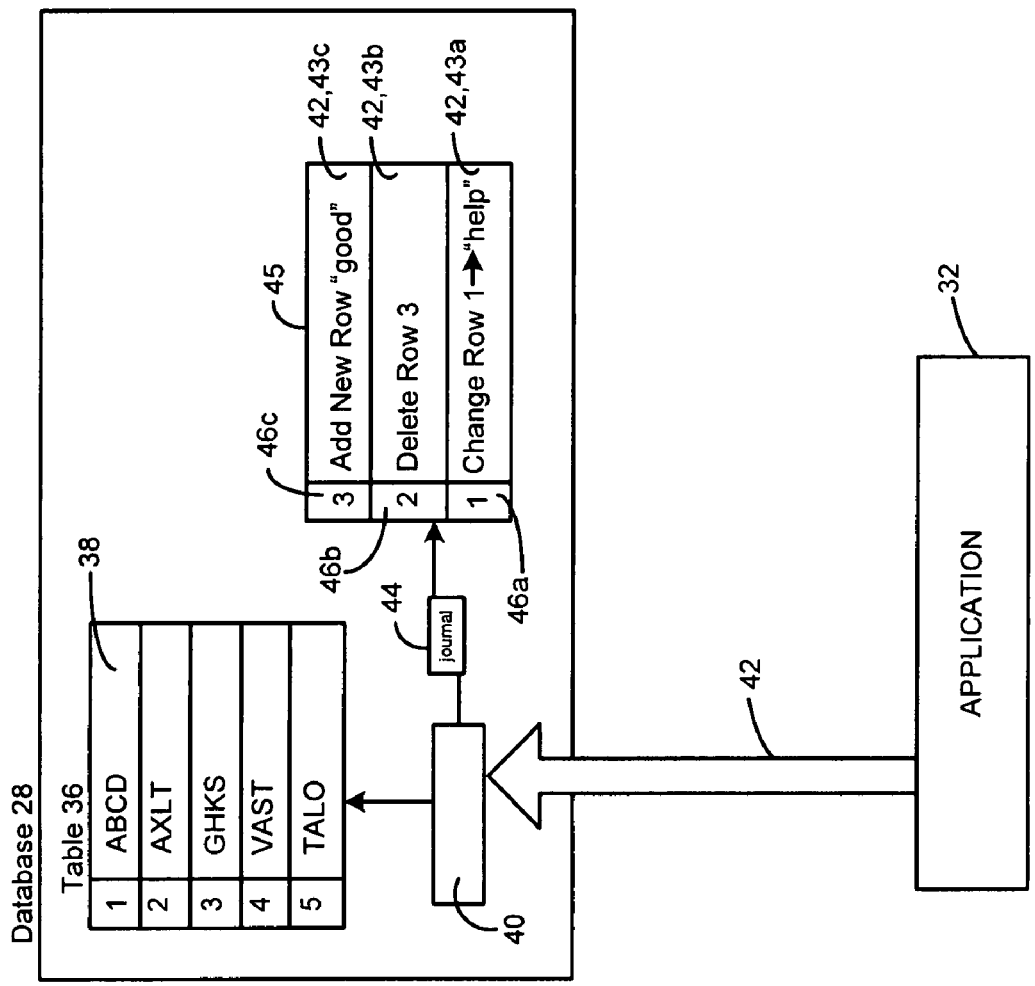

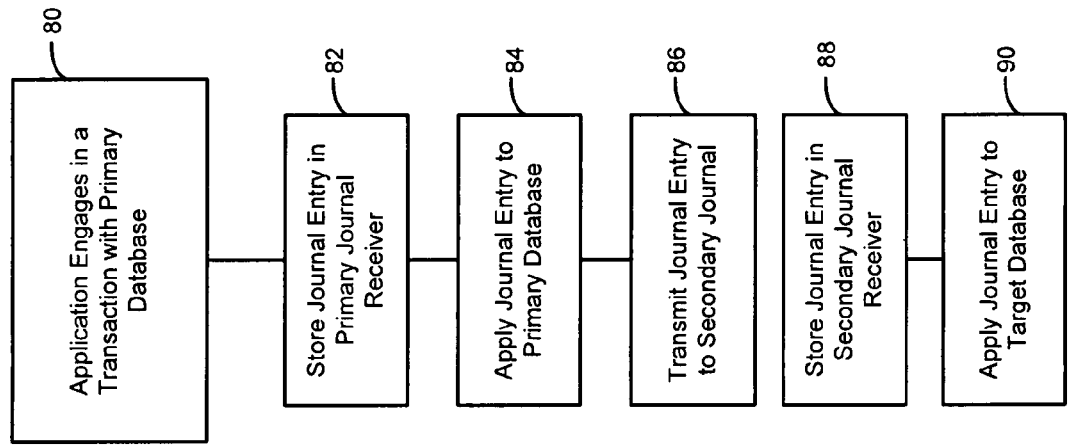
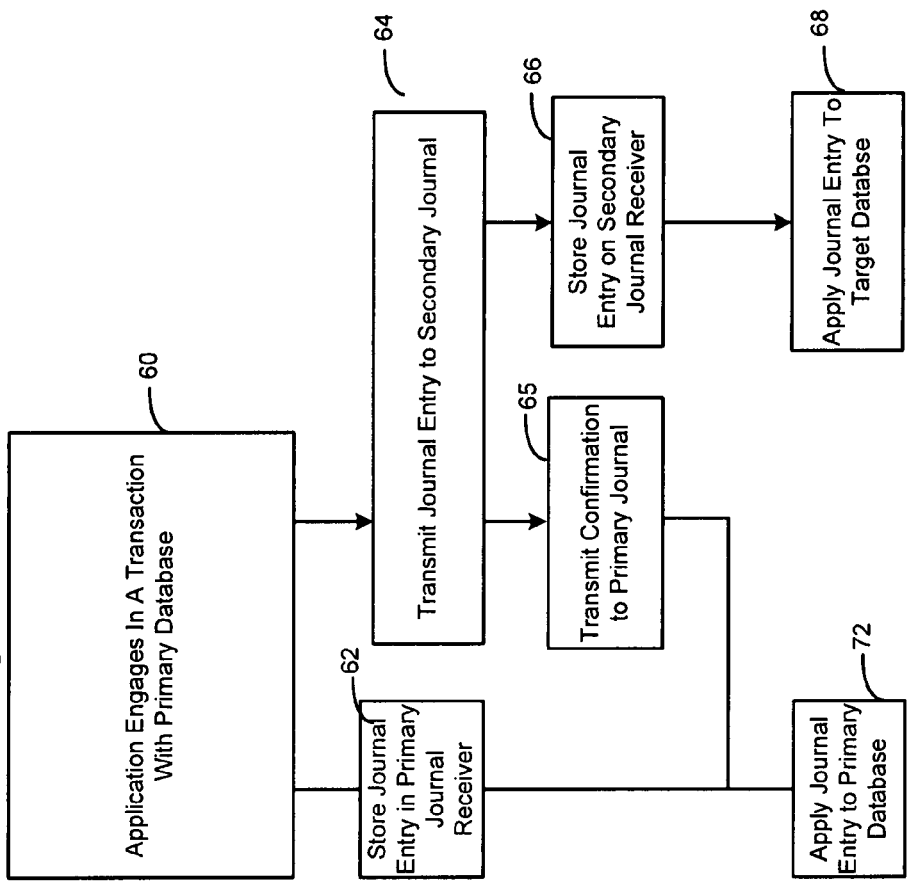

Fig. 7

| | LAST | FIRST | Mi. | APPOINTED BY |
|---|---|---|---|---|
| 00 | Alito | Samuel | A. | George W. Bush |
| 01 | Roberts | John | G. | George W. Bush |
| 02 | Breyer | Stephen | G. | William J. Clinton |
| 03 | Ginsberg | Ruth | B. | William J. Clinton |
| 04 | Thomas | Clarence | | George H. W. Bush |
| 05 | Souter | David | H. | George H. W. Bush |
| 06 | Kennedy | Anthony | M. | Ronald W. Reagan |
| 07 | Scalia | Antonin | G. | Ronald W. Reagan |
| 08 | Stevens | John | P. | Gerald R. Ford |

Fig. 8

| File (102) | Seg # (103) | Beg. (104) | End (105) | CRC Value (106) | Status (107) | Apply Job (108) | Replication Project (109) |
|---|---|---|---|---|---|---|---|
| 1 (102a) | 1 (103a) | 00 (104a) | 02 (105a) | 0X3D5526 (106a) | G (107a) | 0 (108a) | 1 (109a) |
| 1 (102b) | 2 (103b) | 03 (104b) | 05 (105b) | 0X3D5398 (106b) | G (107b) | 0 (108b) | 1 (109b) |
| 1 (102c) | 3 (103c) | 06 (104c) | 08 (105c) | (106c) | G (107c) | 0 (108c) | 1 (109c) |
| 1 (102d) | 3 (103d) | 06 (104d) | 08 (105d) | 0X3E1A52 (106d) | G (107d) | 0 (108d) | 1 (109d) |

METHOD FOR AUDITING DATA INTEGRITY IN A HIGH AVAILABILITY DATABASE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention generally relates to distributed data processing methods. More particularly, the present invention relates to methods for auditing the integrity of data being replicated on high availability computer systems.

2. Related Art

Business processes have become so intertwined with information technology (IT) as to make them inseparable. The flow of accurate, real-time information is critical to the success of modern businesses, and its availability to users of all types is considered a significant advantage in highly competitive markets.

Earlier centralized computing environments processed modest amounts of batch input and typically produced reports aggregating small chunks of information into meaningful results. Processing was managed as a result of sequential input and output, i.e., single-threading, and was fairly small by contemporary standards. As the demand for information grew, there were increased demands on processing capabilities. The centralized computing environments evolved into central system complexes, paving the way for multiple processes running in parallel, i.e., multi-threading. Thereafter, rudimentary interactive processing through communication monitors was developed, ushering in the transaction-processing requirements associated with most businesses.

Demand for information access increased still further as users gained additional power in the processing and manipulation of data, leading to the client/server topology, browser based technology, and the like. Client/server describes the relationship between two computer applications in which one application, the "client," makes a service request from another application, the "server," which fulfills the request. The client/server relationship model can be implemented by applications in a single computer, such as where one program acts as a "client" and interfaces with the user, while another program acts as a "server" by providing data requested by the "client." An example of such a configuration is the X-Windows system. The relationship model may be expanded to networked environments, where it defines an efficient way to interconnect applications and data distributed across distant locations.

While there are significant advantages in structuring data processing network systems according to the client/server model, one well-recognized concern is that the server is a single point of failure. Despite the improved reliability of individual hardware and software components, anything from a minor process failure to a system-wide crash results in interruptions to the data and services provided by the server, also known as downtime. Additionally, problems with the network interconnecting the client and the server could experience problems, leading to further downtime. With global commerce being conducted across multiple countries and time zones simultaneously over the Internet, there is an increasing need to maintain operations and maximize uptime of computer systems that support such commercial transactions. Accordingly, there is no time to backup or verify static data as has been done with traditional CRC technology. The elimination of such single point of failure system-wide is a key element of high availability computer systems. Multiple servers, which are also referred to in the art as "nodes," were organized in clusters. A number of different clustering methodologies were developed, each offering varying degrees of high availability. In an Active/Active cluster, traffic intended for a failed node is either passed onto an existing node or load balanced across remaining nodes. An Active/Passive cluster provides a fully redundant instance of each node, with a passive node taking over the active node only upon failure of the active node. Further, an N+1 type cluster provides an extra single node that is brought online to take over the role of the failed node. These high availability systems require that all data stored on the production or primary node to be mirrored on the backup node. This ensures that any data stored on the primary node is available for retrieval on the backup node in case the primary node fails.

The simplest method is to periodically copy all of the data on the production node to the backup node. As will be appreciated, however, this is deficient for high-availability systems because there is a lag between the backup operations. For example, any modification to data before failure but after the last backup operation is lost, and any restored version from the backup node will not reflect the modifications. Furthermore, this method can require significant network bandwidth and data processing resources due to the potentially large volumes of data, and may decrease the life of the physical storage device. These problems can be alleviated to some extent with the use of an incremental backup or synchronization method where only those data files that have been changed since the previous backup are copied from the primary node to the backup node. Typically, when a file is modified, only a small portion of the file is actually changed from the previous version. While an incremental backup or synchronization can reduce network bandwidth and save storage space compared to a complete backup or synchronization, it is still inefficient in that a complete file is transferred even though it is possible that only a small portion of the file was actually modified.

As an improvement to incremental backups or synchronizations, there are backup processes that identify the differences between two versions of a file, and attempt to copy only those differences. This can further reduce network bandwidth and storage requirements because only portions of the file are transmitted between the primary node and the backup node. One deficiency with this backup method was the heavy processing power necessary for deriving the differences between the files, particularly with large files.

Such deficiencies are particularly evident in relational databases, since the database management system stores all of the records thereof in a single file. Database management systems such as DB/2 developed by IBM Corporation Armonk, N.Y. organize records into particular fields, tables, and databases (a set of multiple tables). Typically, separate files are not generated for each table or fields.

The aforementioned conventional backup and synchronization methods are insufficient for high availability database applications. Specifically, high volumes of data must be replicated, and modifications are constantly being made thereto. Thus, there is a possibility that at any given moment, the primary node and the backup node do not have identical data. An alternative to incremental backups and the like of individual files containing a representation of the data structures of the respective databases is a journaling system incorporated into the database. The journaling system generates a log of each operation upon the primary node database, such as changing the value of a record, deleting the record, adding a new record, and so forth, and transmits that log to the backup node database. The backup node processes this log, and performs the operation thereon, resulting in up-to-date, identical databases between the production node and the backup node. Thus, the backup node is ready to take over operations immediately upon failure of the primary node, and all data on the backup node is identical to the data on the failed primary node.

While replication of data from the primary node to the backup node in this fashion is generally reliable, there may be instances where errors are introduced during transmission, or where there are race conditions between the primary and backup nodes, otherwise known as collisions. Inadvertent or intentional user access to the backup node without updating the primary node is another source of data corruption. In response, Cyclic Redundancy Check (CRC) processes have been utilized to detect errors in the data transmitted to the backup node. However, the source of errors is not limited to those occurring during transmission, so there is a need in the art for a system to continuously monitor the integrity of all data stored on a backup node database, and to flag and/or repair any errors upon discovery. Furthermore, because such integrity checking operations are time and resource intensive, there is a need for monitoring the integrity of the primary node while it is fully operational, that is, while updates are being made to the primary node database that is being replicated on the backup node database. Additionally, there is a need for seamlessly incorporating data validity checking in any high availability replication environment.

BRIEF SUMMARY

According to one embodiment of the present invention, there is provided a method for maintaining the integrity of a backup database table on a secondary node against an original database table on a primary node, while the original database table is dynamically changing and being actively replicated to the secondary node. The method may include generating an original checksum of a segment of the original database table between a beginning record and an ending record. The method may also include storing the original checksum, a beginning record address, and an ending record address in an original control database table. The beginning record address and the ending record address may identify the respective one of the beginning record of the segment and the ending record of the segment. The method may further include storing in a backup control database the original checksum, the beginning record identifier, and the ending record identifier. Generating entries in the journal reflective of the modifications to the control table containing the beginning and ending segments and the checksum value allows the method to be used in conjunction with external, third party replication systems. Furthermore, the method may include generating a backup checksum of a segment of the backup database table between a beginning record and an ending record. The beginning record and the ending record may be identified by the respective one of the beginning record address and the ending record address stored in the backup control database.

According to another aspect of the present invention, there is provided a method for maintaining the integrity of a backup data sequence on a secondary node against an original data sequence on a primary node. The method may include generating an original checksum of a segment of the original data sequence between a beginning point and an ending point. The method may also include storing the original checksum, a beginning address, and an ending address in an original control data sequence. The beginning address may identify the beginning point of the segment. The ending address may identify the ending point of the segment. Further, the method may include generating an entry in a journal. The entry may be representative of the original checksum, the beginning address, and the ending address stored in the original control data sequence. The method may conclude with transmitting the journal entry to the secondary node.

According to yet another aspect of the present invention, a method for maintaining the integrity of a backup data sequence on a secondary node against an original data sequence on a primary node may include receiving an entry in a journal. The entry may be representative of data stored on an original control data sequence. That data may include an original checksum of a segment of the original data sequence between a beginning point and an ending point, a beginning address identifying the beginning point, and an ending address identifying the ending point. The method may include storing the original checksum, the beginning address, and the ending address in a backup control data sequence. Furthermore, the method may include generating a backup checksum of a segment of the backup data sequence between the beginning point as identified by the beginning address and the ending point as identified by the ending address.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3 is a block diagram of the primary node, including a database, an exemplary table of the database, a journal, and an application interacting with the database;

FIGS. 4a-4c are diagrams illustrating the contents of the exemplary table at various point following the execution of commands issued from the application;

FIG. 5 is a flowchart detailing synchronous replication;

FIG. 6 is a flowchart detailing asynchronous replication;

FIG. 7 is an exemplary database table suitable for use in conjunction with one aspect of the present invention;

FIG. 8 is an exemplary control table in accordance with one aspect of the present invention;

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
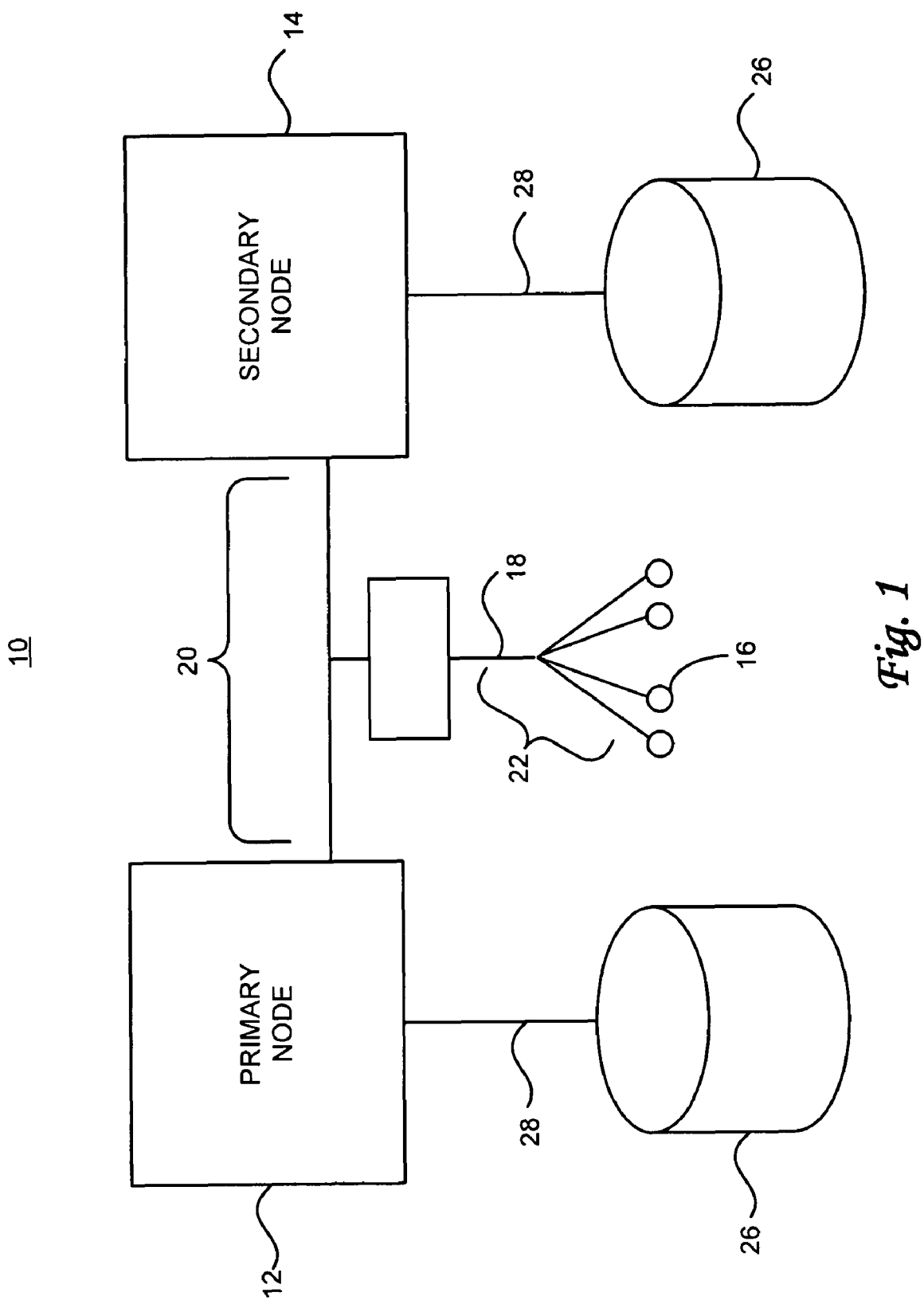
FIG. 1 is a block diagram illustrating an exemplary cluster including a primary node and a secondary node, upon which the present invention may be implemented.

One aspect of the present invention is directed to a method for maintaining the integrity of a replicated database in a high availability computer system. With reference to FIG. 1, the high availability computer system is implemented as a cluster 10 including a primary node 12 and a secondary node 14 providing services to clients 16 over a network 18. Specifically, the term client may refer to any other data processing device operative to receive the services provided by the cluster 10, and is not intended to be limited to a particular computing system. As indicated above, one of the objects of high availability is to provide redundancy and eliminate single points of failure. In one configuration, the primary node 12 and the secondary node 14 concurrently operate. More specifically, updates to the data stored on the primary node 12 are replicated on the secondary node 14, and when the primary node 12 becomes unavailable for planned or unplanned reasons, the secondary node 14 takes over operations immediately. Such configurations are referred to as an Active/Passive configuration. In another configuration known as the Active/Active configuration, the computing load on the primary node 12 is shared with the secondary node 14. It is understood that additional nodes may be added to the cluster 10 to increase performance and reliability.

In one exemplary embodiment of the cluster 10, the network 18 is divided into a local segment 20 and an external segment 22, with an interconnection device 24 linking the two. As those skilled in the art will appreciate, the network 18 can implement any desired network protocol such as Ethernet (I.E.E.E. 802.3) or Token Ring. Further, interconnect device 24 can be a hub, a router, or any network interconnect device suitable for a particular network. In the above-described active/passive high configuration, the cluster 10 is assigned a single logical host address that the client 16 can identify. Thus, when the recipient 16 requests a service from the computer cluster 10, it need only specify the logical host address. From the perspective of the client 16, the cluster 10 appears as a single computing resource regardless of the node providing the service.

Data being processed by the cluster 10 is preferably stored in one or more data storage devices 26 connected locally or via a storage area network (SAN) 28. Additional data storage devices 26 may be added to increase redundancy and improve availability. As will be understood, the data storage device 26 appears as a locally connected device to the primary node 12 and the secondary node 14, in that data is written to and read from the storage device 26 at the block level. Typically, the storage area network 28 uses the Small Computer System Interface (SCSI) protocol over at least a 1 gigabit fiber channel. Instead of a SCSI connection over a fiber transmission line, the storage area network 28 may utilize the Internet SCSI (iSCSI) protocol over a conventional LAN networking technology. The data storage device 26 is commonly a hard drive, although tape drives and other similar devices may be utilized.

Figure 2:
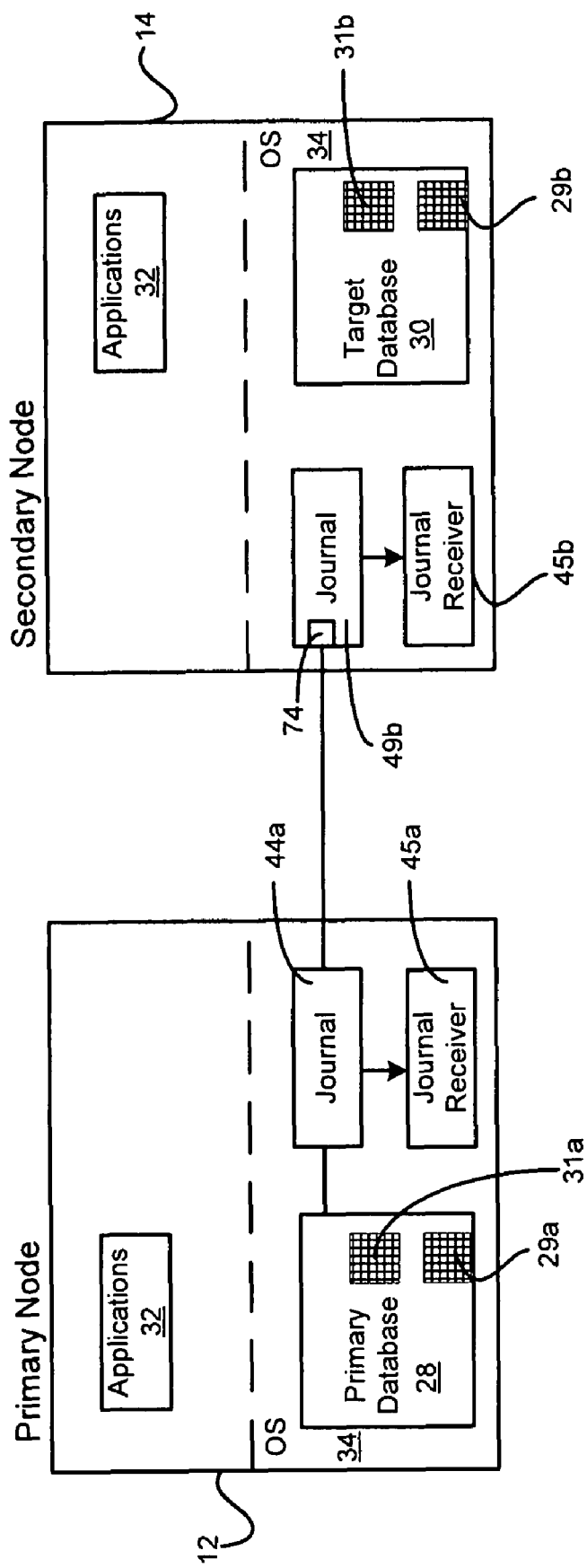
FIG. 2 is a detailed block diagram illustrating the interconnected remote journaling components of the primary and secondary nodes.

With reference to FIG. 2, according to one preferred embodiment of the present invention, the primary node 12 is mirrored on the secondary node 14. Specifically, the primary node 12 includes a primary database 28 that is replicated in the secondary node 14 as a target database 30. Various applications 32 modify the data stored in the primary database 28, and is logically segregated from an operating system 34. While the applications 32 on the secondary node 14 do not modify or read the data stored on the target database 30, it is ready to do so upon taking over operations upon the primary node 12 transitioning to an offline state. Further details relating to the replication of the primary database 28 will be described below.

It is contemplated that the operating system 34 may be any one of the numerous computer operating systems known in the art, and is understood to manage the hardware and software resources of the primary node 12 and the secondary node 14. The operating system 38 may be i5/OS (previously known as OS/400, available from IBM Corporation of Armonk, N.Y.), a UNIX variant such as AIX (previously known as Advanced IBM Unix), Linux, or FreeBSD, or Microsoft Windows. It will be recognized by one of ordinary skill in the art that, as depicted in the block diagram of FIG. 2, the operating system 38 is i5/OS, as the primary database 28 and the target database 30 are integrated into the operating system 38 of the respective nodes. Along these lines, the primary database 28 and the target database 30 are understood to be a version of the DB2 relational database management system, also from IBM Corporation.

Replication refers to the copying of data from one place to another, and as indicated above, the most efficient way of doing so is transporting only the changes made to the primary database 28 to the target database 30. Preferably, the replication process does not interfere with the operation of the applications 32. There are a number of techniques that may be utilized to replicate the primary database 28 to the target database 30, though the most common way is via remote journaling.

In general, journaling refers to the technique of logging transactions to a set of data in a separate memory location in such a manner that each transaction may be recovered if necessary. With reference to FIG. 3, the exemplary primary database 28 includes a data table 36 comprised of multiple records 38. A database engine 40 intercepts various commands 42 issued sequentially by the application 32, transmits the same as entries 43a-c to a journal 44. The journal entries 43a-c are saved to a journal receiver 45, and typically includes unique identifiers 46a-c corresponding thereto. Although in the exemplary journal entries 43a-c, the identifiers 46a-c are sequential integers, it is understood that the identifiers 46a-c may also be time stamps that have hour, minute, second, and fractions of a second components Further, the identifiers 46a-c may be a machine cycle number. As will be appreciated by one of ordinary skill in the art, the data table 36 may have additional columns, and there may be multiple data tables associated with the primary database 28. Accordingly, the journal entries 43*a-c* may have additional information that is used to identify a particular column or database. Along these lines, it will be appreciated that the primary database 28 need not be limited to a conventional database with its sole data organization modality being tables with rows and columns. In the one preferred embodiment where the operating system 34 is i5/OS, the primary database 28 is also understood to be a universal database that stores data objects accessible via the database engine 40. In this regard, transactions to such data objects between the applications 32 are also transmitted to the journal 44 and saved to the journal receiver 45.

Each database typically has one journal 44 and one journal receiver 45, a so-called "master" journal that logs the transactions of each of the data tables 36 associated therewith. Generally, the journal 44 refers to the functional component of the database 28 that processes the journal entries 43, while the journal receiver 45 refers to the block of memory that stores the journal entries 43. However, it is understood that multiple journals 44 and corresponding journal receivers 45 may be set for multiple subsets of the data tables 36. The particular number of the journals 44 to be set for a given database with multiple data tables 36 depends on a variety of factors, including the desired run-time performance, recovery duration, replay parallelism, and remote journal transport efficiency. It is within the capabilities of one of ordinary skill in the art to assess the needs of a particular application, and accordingly varying the number of the journals 44.

After writing each entries 43*a-c* to the journal receiver 45, the database engine 40 may complete the transaction by performing the requested operation on the table 36. Before performing the requested operation on the table 36, however, the database engine 40 may request a confirmation from the journal 44 that the corresponding entry was properly entered. As shown in FIG. 4*a*, the command corresponding to the first journal entry 43*a* directs that the first row 48 is changed to "help". Next, as shown in FIG. 4*b*, the second command corresponding to the second journal entry 43*b* directs that a third row 50 be deleted. According to one embodiment, the database engine 40 may remove the contents of the third row 50 and leaving it empty, while retaining the indexing. Alternatively, the table 36 may be re-indexed, that is, the contents of a fourth row 52 being moved to a third row 50, and the contents of a fifth row 54 being moved to the fourth row 52. Thereafter, as shown in FIG. 4*c*, the command corresponding to the third journal entry 43*c* specifies that a new sixth row 56 with the contents "good" be added.

Referring back to FIG. 2, remote journaling refers to the technique of continuously transmitting the journal entries made on the primary node 12 to the secondary node 14, and performing the operations specified thereby on the secondary node 14. In the exemplary configuration, the primary node 12 includes a primary journal 44*a* and a primary journal receiver 45*a*, while the secondary node 14 includes a secondary journal 44*b* and a secondary journal receiver 45*b*. The primary journal receiver 45*a* is understood to be an exact replica of the secondary journal receiver 45*b*, and contain identical time stamps, and other related data. The remote journaling can function synchronously or asynchronously, the details of which will be described further below.

With reference to FIGS. 2 and 5, in synchronous remote journaling, the process generally initiates with a step 60, in which the application 32 engages in a transaction with the primary database 28. More specifically, as indicated above, the application 32 transmits commands 42 to the primary database that adds, edits, deletes, or otherwise modifies the data stored on the primary database 28. Next, per step 62, the commands 42 are received by the primary journal 44*a*, and stored as journal entry 43 in the primary journal receiver 45*a*. Simultaneously, per step 64, the journal entry 43 is transmitted to the secondary journal 44*b* on the secondary node 14. The journal entry 43 is received in a buffer 74, and according to step 66, the journal entry 43 is written to the secondary journal receiver 45*b*. Further, per step 55, the secondary journal 44*b* transmits a confirmation message back to the primary journal 44*a* after receipt in the buffer 74. With receipt of the confirmation message by the primary journal 44*a*, according to step 72, the database operation/command 42 is performed on the primary database 28. Independently of the primary node 12, the database operation/command 42 specified by the journal entry 43 is performed on the target database 30 in step 68 by a replication program. It is understood that the replication program provides additional, higher level functionality with respect to the processing of database updates, and refer to such products as the Object Mirroring System (OMS) from Vision Solutions, Inc. of Irvine, Calif.

In this manner, the target database 30 is updated in real time with all of the journal entries 43 as they are generated by the application 32. It is understood that synchronous journaling allows for recovery that loses no journal entries 43 on the target database 30 if an outage is experienced in the primary database 28. Specifically, there are no trapped transactions on the primary node 12, since any modifications are received to the secondary journal 44*b* before being made on the primary database 28. However, it will be appreciated that the overall source application throughput of a synchronously remote journaled high availability cluster 10 may be impacted.

Referring now to FIGS. 2 and 6, in asynchronous remote journaling, the process likewise begins with a step 80 where the application 32 engages in a transaction with the primary database 28. The application 32 transmits a command 42 to the primary database 28 that is received by the primary journal 44*a*. The resultant journal entry 43, according to step 82, is stored in the primary journal receiver 45*a*, and applied to the primary database 28 per step 84. At some time after storing the journal entry 43 in the primary journal receiver 45*a*, the journal entry 43 is transmitted to the secondary journal 44*b* in step 86, and stored in the secondary journal receiver 45*b* in step 88. Thereafter, the transaction specified in the journal entry 43 is applied to the target database 30 by the replication software It will be appreciated that in asynchronous replication, the primary database 28 may have transactions applied thereto that have not yet reached the target database 30. If the primary node 12 crashes after having applied a transaction but before it was able to transmit a corresponding journal entry 43 to the secondary journal 44*b*, that transaction is trapped thereon. Asynchronous replication may be used in situations where the delayed arrival of the journal entries 43 is tolerable, or where the primary node 12 is heavily utilized to such a point that dedicating additional resources to synchronized replication is not desirable. It may also be appropriate where the communication and networking speed between the primary node 12 and the secondary node 14 does not have sufficient bandwidth.

Having considered the environment of the cluster 10 including the primary node 12 and the secondary node 14, as well as the techniques involved with replicating the primary database 28 to the target database 30, further details relating to a method for maintaining the integrity of the target database 30 against the primary database 28 in accordance with one aspect of the present invention will now be described. For purposes of illustrative example, reference will be made to FIG. 7 and a database table 94 that represents the structure and contents of primary and target data tables 29a, 29b of the primary and secondary databases 28, 30. Reference will also be made to FIG. 8 and an exemplary control table 100 with a first entry 101a, a second entry 101b, a third entry 101c, and a fourth entry 101d. The control table 100 represents the structure of the primary control and target control tables 31a, 31b. Unless otherwise noted, the control table 100 also represents the contents of the primary control and target control tables 31a, 31b. Each of the entries 101a-c have a file or object identifier 102, a segment number identifier 103, a beginning record identifier 104, an ending record identifier 105, a checksum value 106, a status identifier 107, an apply job identifier 108, and a replication product identifier 109, the details of each of which will be discussed more fully below. It will be appreciated that the specific fields in the control table 100 are presented by way of example only and not of limitation, and any other fields may be included to provide additional functionality.

Figures 9, 10:
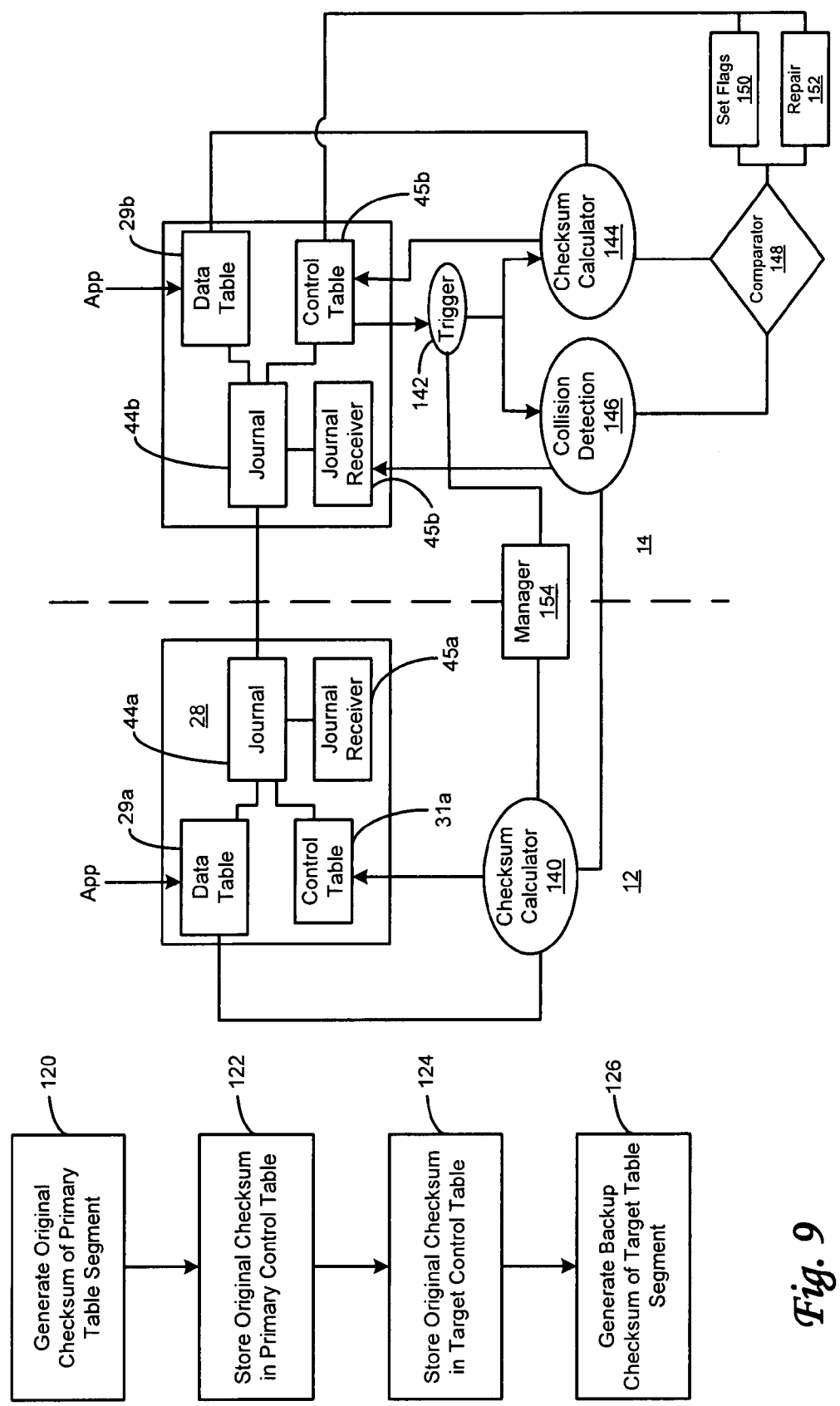
FIG. 9 is a flowchart illustrating the method of verifying the integrity of a target data table against a primary data table in accordance with one aspect of the present invention.
FIG. 10 is a block diagram illustrating the various components of the primary node and the secondary node that are together capable of performing the method of verifying the integrity of the target database.

With further reference to the flowchart of FIG. 9 and the block diagram of FIG. 10, the method in accordance with one aspect of the present invention begins with a step 120 of generating a checksum of the primary data table 29a between a beginning record and an ending record. As indicated above, the primary database 28 running on the primary node 12 includes the primary data table 29a, a primary control table 31a, a primary journal 44a, and a primary journal receiver 45a. A checksum calculator 140 external to the primary database 28 accesses, for example, a first segment 110 that includes a first or beginning record 96a, a second record 96b, and a third or ending record 96c, and generates a checksum thereof.

In one embodiment of the present invention, the checksum is a Cyclic Redundancy Check (CRC) code. A CRC code can serve as a unique identifier that represents the contents of a logical block of data, and is derived from that block of data. The size of the block can be arbitrary, though it is generally the same for both the block that is being verified and the block that is being verified against. When the contents are changed, the CRC value should also change. Ideally, a CRC algorithm has polynomial time complexity and very little space complexity. More specifically, if the size of a block of data is N, the time required to generate a CRC code of that block of data is K*N, where K is a constant, and has relatively small memory requirements. The CRC value itself should consume very little space relative to the amount of data it represents. As is understood in the art, there is a probability that a CRC code may not detect the modification of a block of data even though the contents of the data have been changed. This probability depends on the length of the CRC. Assuming that $C_b$ is the polynomial of the contents of block B and the polynomial of the CRC computation is P, then $2^{len(Cb)}/2^{len(P)}$ possibilities exist of calculating the same CRC code. However, assuming that there is an equal probability for any bit to be changed, the number of combinations is $2^{len(Cb)}$. Thus, the probability of two blocks of different data having polynomials that result in the same CRC value is $2^{len(Cb)}/2^{len(P)}/2^{len(Cb)} = 1/2^{len(P)}$. As such, the probability of failure, or matching CRCs from two blocks of different data, depends upon the length of the polynomial and does not depend on the length of the content it divides. However, by choosing a CRC of considerable length, the probability of failure can be greatly decreased. While there will be a signature size increase, increasing the length is understood not to affect performance.

According to one embodiment of the present invention, the length of the CRC is 32 bits. With this length, the probability that the same CRC code will be generated for a different data sequence is approximately $2^{32}$, or 1 in 4.294 billion. For a file that has a thousand segments, the probability that an identical CRC code would be generated is approximately $1-(2^{32}-1)/(2^{32})$, or 1−0.99999767, or around 1 in five million.

The method continues with a step 122 of storing the checksum, a beginning record address, and an ending record address in the primary control table 31a, where the beginning record address identifies the beginning record of the segment and the ending record address identifies the ending record of the segment. For example, as shown in the first entry 101a of the exemplary control table 100, a first beginning record address 104a with a value of "00" corresponds to the address 99 of the beginning record 96a, and a first ending record address 105a with a value of "02" corresponds to the address 99 of the ending record 96c. Particularly as related to databases, it is understood that the address refers to the relative record number of the database. Additionally, as a result of the checksum generation step 120, a first checksum 106a is stored in the primary control table 31a. In addition to the data mentioned above, the exemplary control table 100 includes a first segment identifier 103a, a first file identifier 102a that specifies the particular file, table, or other data object associated with the primary database 28 to which the particular entry 101a pertains. The first entry 101a may also include a first status identifier 107a, a first apply job identifier 108a that specifies to the secondary journal 44b which apply job the target database 30 is using to write to the target control table 31b, and a first replication product identifier 109a. According to one embodiment, the foregoing data may be stored in encrypted form.

It is expressly contemplated that the verification of the target database 30 against the primary database 28 is conducted independently of, or orthogonal to, any replication operations therebetween. As such, it is understood that data on the primary database 28 is constantly being updated by the applications 32 with corresponding changes being made to the target database 30 in accordance with the techniques discussed above, while verification is conducted.

According to another aspect of the present invention, the method for maintaining the integrity of the target database 30 may also include generating a journal entry in the primary journal 44a, which is stored in primary journal receiver 45a. The entry is understood to be representative of the first checksum 106a, the first beginning record address 104a, and the first ending record address 105a as stored in the primary control table 31a. Additionally, the journal entry may be representative of the first status identifier 107a, the first apply job identifier 108a, and the first replication product identifier 109a. Generally, upon writing the aforementioned data to the primary control table 31a, it is understood that the primary database 28 generates the corresponding journal entries in response. As indicated above, such journal entries may be handled synchronously or asynchronously by the primary and target databases 28, 30.

After generating the first checksum 106a for the first segment 110 between the first record 96a and the third record 96c, the method contemplates generating a second checksum 106b for a second segment 112 between a fourth record 96d and a sixth record 96f. In other words, a unique checksum is generated for each segment of the primary data table 29a, with each unique checksum and corresponding beginning and ending addresses being stored in the primary control table 31a. Along these lines, a corresponding second beginning address 104b equal to the address "03" of the fourth record 96d, and a corresponding second address 105b equal to the address "05" of the sixth record 96f is stored in the primary control table 31a. A subsequent, second segment identifier 103*b* is also recorded, signifying that the entry 101*b* relates to the second segment 112. Because the second segment 112 is of the primary data table 29*a*, the second file/object identifier 102*b* has a value "1" equivalent to that of the first file/object identifier 102*a*. Similarly, the second status identifier 107*b*, the second apply job identifier 108*b*, and the second replication product identifier 109*b* have values equivalent to the first status identifier 107*a*, the first apply job identifier 108*a*, and the first replication product identifier 109*a*, respectively.

There is substantial latitude in the techniques of generating the checksums across the entirety of the primary data table 29*a*. More specifically, the number of records in a segment may be varied by administrator-defined configuration options that may be modified according to the desired throughput. For example, the size of the segment may be increased for systems having increased data processing capabilities, increased bandwidth, and so forth. The generation of the checksums may begin with a predetermined record that is not necessarily the first logical one, for example, the fourth record 96*d* instead of the first record 96*a*. Further, it may proceed sequentially as described above, or randomly, for example, by generating the checksum for a third segment 114 first, followed by the first segment 110, then by the second segment 112. The checksum calculator 140 may be configured to generate checksums for a desired percentage of segments for a predetermined length of time. By way of example, twenty percent of the records in the primary data table 29*a* may be analyzed, that is, the checksums of the segments thereof be generated and stored in the primary control table 31*a* every twenty four hours in order to limit the processing burden on the primary node 12. Along these lines, it is also contemplated that the administrator may select only certain desired segments for which the checksums are generated, such as selecting only the first segment 110 and the third segment 114.

The generation of the first checksum 106*a* and the second checksum 106*b*, as well as the storage of the same and related data to the control table 31*a* may be performed sequentially in one thread as described above, or performed in separate threads. Thus, multiple segments may be processed in parallel, with the number of segments being processed at any given point being adjustable by the administrator according to the desired throughput.

As indicated above, once the journal entry is received by the target journal 44*b* and stored in the journal receiver 45*b*, the operation specified thereby is executed on the target database 30. More specifically, in the exemplary journal entry generated by the journal 44*a* above, the specified operation is writing data to the primary control table 31*a*, including the values of the first checksum 106*a*, the first beginning record address 104*a*, the first ending record address 105*a*, the first status identifier 107*a*, the first apply job identifier 108*a*, and the first replication product identifier 109*a*. This operation is performed on the target control table 31*b*, and as illustrated in the flowchart of FIG. 9, the method of maintaining the integrity of the target database 30 continues with a step 124 of storing first checksum 106*a*, as well as the aforementioned data, in the target control table 31*b*.

The storing step 124 is operative to initiate an external trigger program 142. The trigger program 142 calls a checksum calculator 144, which accesses the target control table 31*b* to retrieve the last written one of the entries 101. Thereafter, the method continues with a step 126 of generating a target checksum of the target data table 29*b*. It is assumed for purposes of this example that the target control table 31*b* contains identical data as the primary control table 31*a*, that is, the data shown in FIG. 8 in the control table 100. The checksum calculator 144 generates the target checksum of the first segment 110 of the target data table 29*b* between the records specified by the first beginning address 104*a* and the first ending address 105*a*. It is understood that the first beginning address 104*a* and the first ending address 105*a* are parameters to the checksum calculator 144.

Upon generating the target checksum of the first segment 110 of the target data table 29*a*, the value of the checksum is compared to the value of the first checksum 106*a* retrieved from the target control table 31*b* by a comparator 148. According to one embodiment, if the checksums do not match, a flag indicative of errors in that particular segment of the target data table 29*a* may be set (150). As indicated above in the discussion of the CRC checksum, if the target data table 29*a* has any differences with respect to the primary data table 29*a*, the checksum will also be different, subject to certain limitations previously discussed. In further detail, it is understood that differences in the order of the records 96, as well as byte-wise differences in the contents of the records 96 may be detected. If the checksums match, a flag indicative of the correctness of that particular segment of the target 29 may be set (150). The entry 101 of the control table 100 includes a status identifier 107. It is contemplated that the status identifier 107 has an affirmative value, or "G" signifying the validity of the segment, or a negative value, or "B" signifying the invalidity of the segment. It is also contemplated, however, that the status identifier 107 has additional values "I" or "V" to signify validity or invalidity of the checksum calculations of the segment. Further details relating to the significance of these values will be described more fully below. In another embodiment, if the checksums do not match, a repair program 152 may be initiated to correct the problem in the segment at issue.

It is understood that operation of the checksum calculator 144 on the secondary node 14 is largely governed by the operation of the checksum calculator 140 on the primary node 12. More particularly, without the checksum calculator 140 on the primary node 12 writing to the primary control table 31*a*, the trigger program 142 is not initiated on the secondary node 14. Accordingly, the generation of the checksums across the target table 29*b* may proceed in various ways as described above in relation to the generation of the checksums across the primary data table 29*a*. As discussed above, the number of records in a segment may be varied, the beginning record from which the checksums are generated may be varied, and the sequence of processing the segments may be varied.

Figure 11:
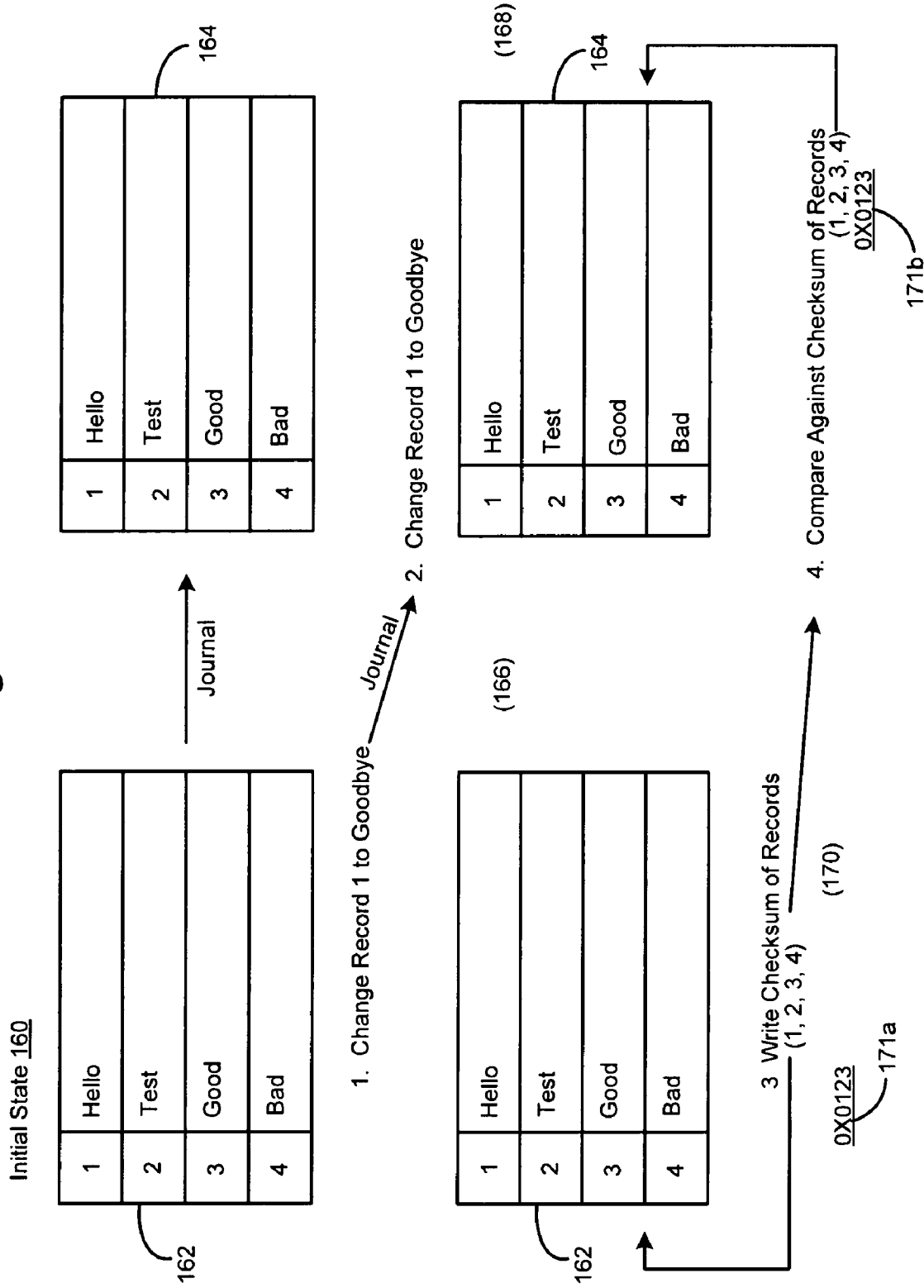
FIG. 11 is an exemplary series of tables where the primary data table is being contemporaneously modified while generating a checksum thereof that yields a valid outcome.

Based on the forgoing, it will become apparent to one of ordinary skill in the art that the state of the primary data table 29*a* when the checksum thereof is generated in step 120 should generally be the same as the state of the target 29*b* when the checksum thereof is generated in step 126. With reference to FIG. 11, a state diagram shows an initial state 160 with a simplified exemplary primary data table 162 and a target data table 164 with identical content. At a first state 166, a first record of the primary data table 162 is changed to "goodbye" instead of the initial "hello". This change is reflected in the target data table 164 in a second state 168. Subsequently, in a third state 170, a primary checksum 171*a* is generated of the primary data table 162 as existing in the first state 166, resulting in a target checksum 171*b* of "0x0123." This is compared against the checksum generated of the target data table 164 as existing in the second state 168. Because the target data table 164 in the second state 168 has the same content as the primary data table 162 in the first state, the checksums thereof are likewise equivalent. As indicated above, each journal entry is processed by the secondary node 14 in the order received. Even where this is not strictly enforced, the foregoing state transitions will be seen if sufficient time is provided between the modification of the primary data table 162 and the generation of the checksum.

Figure 12:
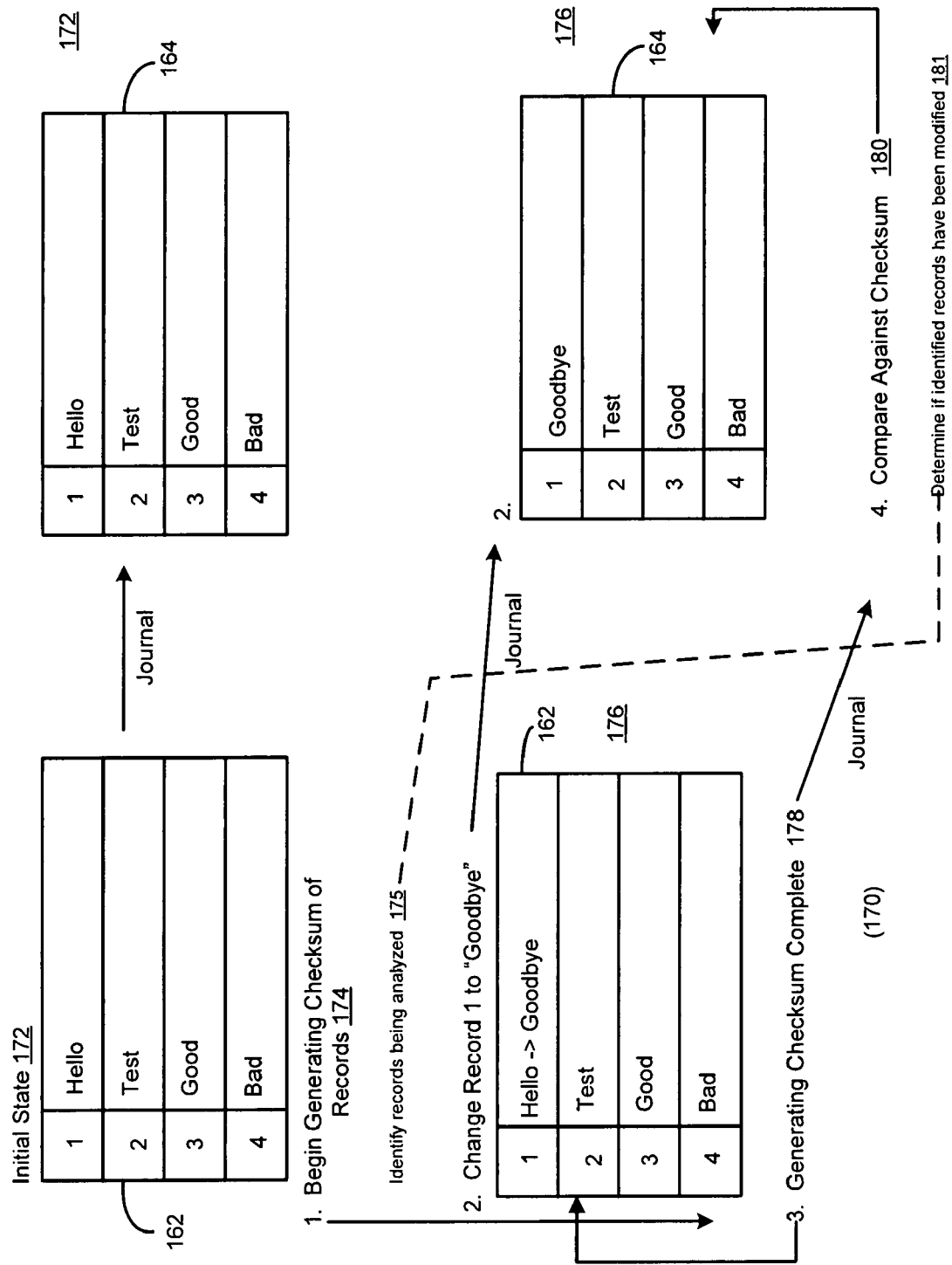
FIG. 12 is another exemplary series of tables where the primary data table is being contemporaneously modified while generating a checksum thereof, where the outcome is invalid.

It will be appreciated that unless a strict order is enforced, the process that finishes first, regardless of which one was started first, will determine the outcome. As will be appreciated, this creates a race condition, otherwise known as a collision, between the primary data table 162 and the target data table 164. With reference to FIG. 12, another state diagram shows an initial state 172 with the simplified exemplary primary data table 162 and the target data table 164 with identical content. At a first state 174, the process of generating a checksum is begun, but does not complete until a third state 178. During the process, a first record of the primary data table 162 is changed to "goodbye," and that change is reflected in a second state 176. After the generating the checksum of the primary table 162 in the third state 178, it is compared against the checksum of the target data table 164 in the fourth state 180. The result of this comparison is uncertain, however, because the checksum may have been generated with the first record having a value of "hello," or having a value of "goodbye."

Enforcing a strict order would decrease throughput, however, and would be impractical where multithreading is utilized to process multiple segments concurrently. As shown in FIG. 10, the secondary node 14 includes a collision detector 146, which provides awareness of the contents of the target journal receiver 45b. More specifically, according to another aspect of the present invention, the checksum calculator 140 writes a collision detection marker in the control table 31a immediately upon initiating the generation of the checksum. With reference to FIG. 8, the control table 100 includes the third entry 101c, which has a beginning record address 104c of "06" and an ending record address 105c of "08." Upon completing the generation of the checksum, the control table 100 has appended thereto the fourth entry 101d, which is identical to the third entry 101c except that the CRC value 106c is included. Upon the third entry 101c being replicated in the target control table 45b, the trigger 142 notifies the collision detector 146 that a checksum is being generated for the specified records as indicated above. After the fourth entry 101d is replicated to the target control table 45b and the checksum of the segment of the target data table 29b is completed, the collision detector 146 retrieves all journal entries between those representative of the third entry 101c and the fourth entry 101d to the target control table 45b. If a record on the primary data table 29a was found to have been modified by any intervening updates, then the status identifier 107 corresponding to the affected segment is set to "I" to indicate that the related checksum 106 is invalid. As shown in FIG. 12, the range of records being analyzed is immediately identified in state 175. In state 180, a determination of whether the range of records for which the checksum was generated was modified. In other words, a log of records modified on the primary data table 162 is kept. According to another aspect of the present invention, the collision detector 146 may signal to the checksum calculator 140 on the primary node 12 that a collision has been detected. Thereafter, the affected segment may be split in half to reduce the possibility of further collisions. Alternatively, the affected segment may be analyzed again in the foregoing manner.

Figure 13:
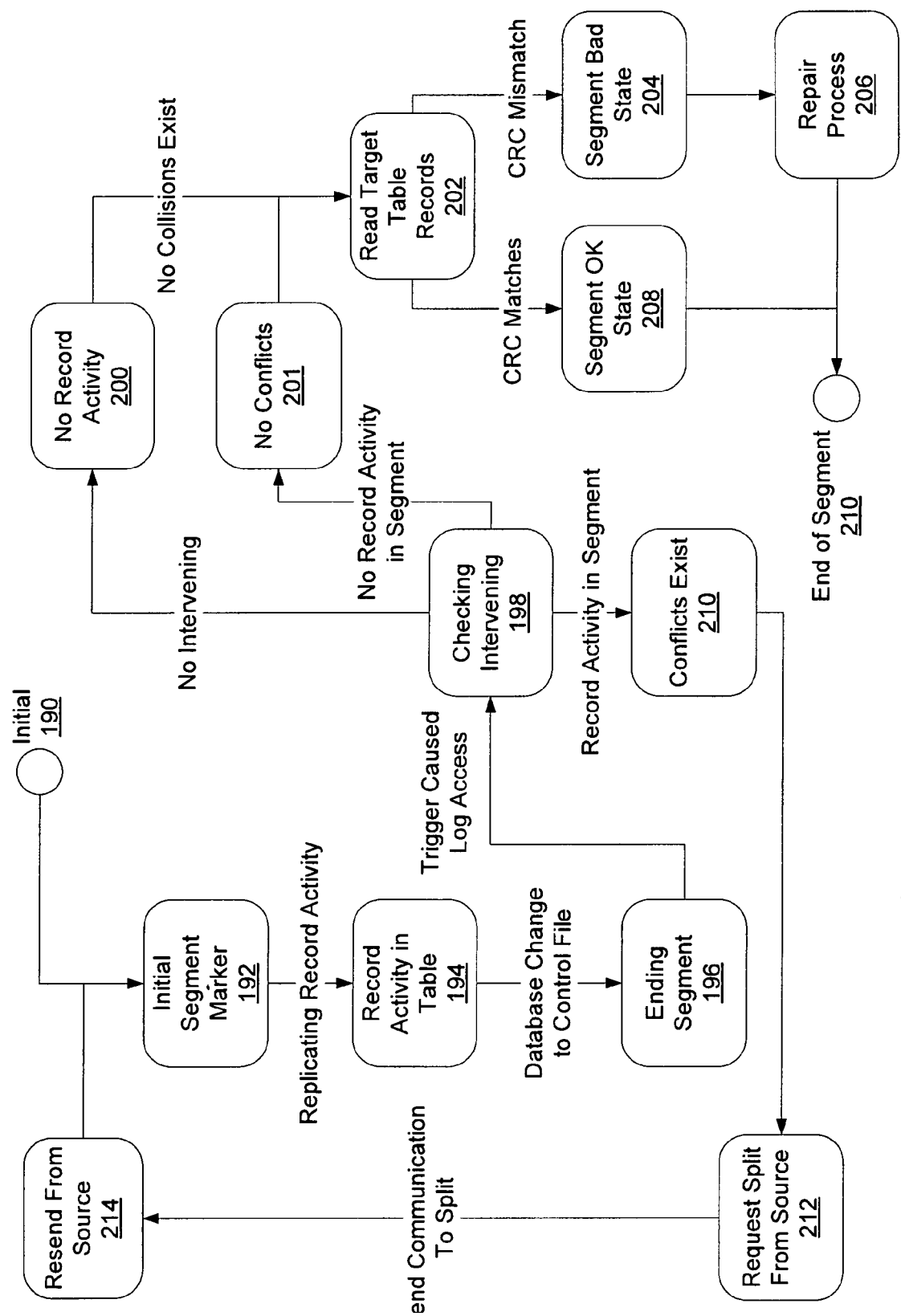
FIG. 13 is a state diagram illustrating collision detection.

The collision detection features may be further illustrated by way of a state diagram of FIG. 13, beginning with an initial state 190. Thereafter, the initial segment marker, representative of the segment which is currently being analyzed on the primary database 28, is written to the primary control table 31a per state 192. Per a state 196, the trigger program 142 starts to read the secondary journal 44b for intervening activities, and evaluates that activity per a state 198. If the beginning and ending segments are contiguous as in a state 200, it is unnecessary to check for intervening entries, and the CRC trigger program 142 will read the records in the target data table 29b according to a state 202. Further, if there are no record activities in the segment per state 201, there is also understood to be no conflict. Thus the CRC trigger program 142 will read the records in the target data table 29b per the state 202 and generate a CRC code, which is compared against the CRC code stored in the target control table 31b. Upon doing so, if there is a CRC code mismatch, the particular segment on the target is understood to be corrupt as per state 204, and the repair process 152 may be initiated according to state 206. On the other hand, if there is no CRC code mismatch, then the particular segment on the target is understood to be verified. Returning to state 198, if there is intervening activity then a conflict exists per state 210. More specifically, if record activity to the table being checked is found and the record numbers are between the starting and ending points, then intervening activity in that particular segment has been found. Thereafter, segment is split in half in state 212, and the CRC code is calculated on the primary database 28 on the new, half-size segment in state 214.

While reference has been made in the foregoing to the primary database 28 and a target database 30 with multiple records 96 and multiple fields 98, it will be apparent to one of ordinary skill in the art that any data organization scheme may be readily substituted without departing from the scope of the present invention. In this regard, data organized as objects, files comprised of a collection of bits, application files, stream files and the like may be replicated, and the integrity thereof be verified, according to an aspect of the present invention.

With reference to FIG. 10, there is a manager 154 that controls and monitors the operation of the primary node 12 and the secondary node 14, at least with respect to the maintenance of data integrity therebetween. The manager 154 may provide an estimate as to the time remaining for the integrity of all segments on the target data table 29b to be checked. Furthermore, the manager 154 may rank the overall health of the target node 14, and the report on the reliability of the data stored therein in case a switchover from the primary node 12. These and other management functionality may be provided by the manager 154, and those of ordinary skill in the art will be able to readily ascertain such functionality.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show more detail than is necessary for the fundamental understanding of the present invention, the description taken with the drawings making apparent to those skilled in the art how the several forms of the present invention may be embodied in practice.

What is claimed is:

1. A method for maintaining the integrity of a backup data sequence on a secondary node against an original data sequence on a primary node, the method comprising:

receiving an entry in a journal, the entry being representative of data stored on an original control data sequence, the data including an original checksum of a segment of the original data sequence between a beginning point and an ending point, a beginning address identifying the beginning point, and an ending address identifying the ending point;

storing in a backup control data sequence the original checksum, the beginning address, and the ending address; and generating a backup checksum of a segment of the backup data sequence between the beginning point as identified by the beginning address and the ending point as identified by the ending address.

2. The method of claim 1, wherein the original data sequence is replicated to the backup data sequence through entries generated in the journal.

3. The method of claim 2, wherein modifications are being made to the original data sequence, the modifications being reflected in the backup data sequence.

4. The method of claim 1, further comprising:
an automatically triggered action verifying against the journal that no conflicting entries for the original data sequence occurred between the beginning point and the ending point.

5. The method of claim 4, further comprising setting an invalid segment flag in the backup control data sequence upon detecting an intervening transaction to the segment between the beginning address and the ending address retrieved from the collision detector marker.

6. The method of claim 1, further comprising setting a flag indicative of errors in the segment of the backup data sequence, the original checksum being unequal to the backup checksum.

7. The method of claim 1, further comprising repairing the segment of the backup data sequence, the original checksum being unequal to the backup checksum.

8. The method of claim 1, further comprising the step of setting a flag representative of the validity of the segment of the backup data sequence, the original checksum being equal to the backup checksum.

9. The method of claim 1, wherein the original checksum and the backup checksum are cyclic redundancy check (CRC) codes.

10. The method of claim 1, wherein the beginning point of the original segment is predetermined.

11. The method of claim 1, wherein the segment between the beginning point and the ending point has a variable length.

12. The method of claim 1, wherein the original data sequence, the backup data sequence, and the control data sequence are database tables with at least one record, the beginning point being a first record and the ending point being a second record.

13. The method of claim 1, wherein the original data sequence, the backup data sequence, and the control data sequence are data files having a plurality of bits, the beginning point being a first bit and the ending point being a second bit.

14. A method for maintaining the integrity of a backup database table on a secondary node against an original database table on a primary node, the method comprising:
generating an original checksum of a segment of the original database table between a beginning record and an ending record;

storing the original checksum, a beginning record address, and an ending record address in an original control database table, the beginning record address and the ending record address identifying the respective one of the beginning record of the segment and the ending record of the segment;

storing in a backup control database table the original checksum, the beginning record address, and the ending record address; and generating a backup checksum of a segment of the backup database table between a beginning record and an ending record, the beginning record and the ending record being identified by the respective one of the beginning record address and the ending record address stored in the backup control database.

15. The method of claim 14, wherein the original database table is replicated to the backup database table.

16. The method of claim 15, wherein modifications made to the original database table are reflected in the backup database table.

17. The method of claim 14, wherein prior to generating the original checksum, the method further includes:
storing the beginning record address and the ending record address as a collision detection marker in the original control database table.

18. The method of claim 14, further comprising:
setting an invalid segment flag in the backup control database table upon detecting a collision between the original data sequence and the backup data sequence.

19. The method of claim 18, wherein a collision is detected where intervening updates have been made to a one of the records in the segment of the original database table between generating the original checksum and storing the original checksum.

20. The method of claim 14, wherein a unique one of the original checksum is generated for each segment of the original database table, each of the unique one of the original checksum and corresponding beginning and ending addresses being stored in the original control database table.

21. The method of claim 14, further comprising setting a flag indicative of errors in the segment of the backup database table, the original checksum being unequal to the backup checksum.

22. The method of claim 14, further comprising the step of repairing the segment of the backup database table, the original checksum being unequal to the backup checksum.

23. The method of claim 14, further comprising the step of setting a flag representative of the validity of the segment of the backup database table, the original checksum being equal to the backup checksum.

24. The method of claim 14, further comprising:
generating an entry in a journal, the entry being representative of the original checksum, the beginning address, and the ending address stored in the original control database table.

* * * * *